US012768492B2

(12) United States Patent
Kim et al.

(10) Patent No.: US 12,768,492 B2
(45) Date of Patent: Oct. 20, 2026

(54) ADJUSTABLE STAND AND ROTATABLE DISPLAY DEVICE

(71) Applicant: LG ELECTRONICS INC., Seoul (KR)

(72) Inventors: Chulki Kim, Seoul (KR); Taegon Kim, Seoul (KR); Jaehyung Jeon, Seoul (KR); Weonyoung Sho, Seoul (KR); Kwangho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 18/701,984

(22) PCT Filed: Nov. 4, 2021

(86) PCT No.: PCT/KR2021/015887
§ 371 (c)(1),
(2) Date: Apr. 17, 2024

(87) PCT Pub. No.: WO2023/080271
PCT Pub. Date: May 11, 2023

(65) Prior Publication Data
US 2024/0410518 A1 Dec. 12, 2024

(51) Int. Cl.
*F16M 11/10* (2006.01)
*F16M 11/18* (2006.01)
(Continued)

(52) U.S. Cl.
CPC ........... *F16M 11/105* (2013.01); *F16M 11/10* (2013.01); *F16M 11/18* (2013.01);
(Continued)

(58) Field of Classification Search
CPC ...... F16M 11/105; F16M 11/10; F16M 11/18; F16M 2200/00; F16M 2200/021;
(Continued)

(56) References Cited

U.S. PATENT DOCUMENTS 6,651,943 B2 * 11/2003 Cho .................. F16M 11/2021 248/122.1
7,264,216 B1 * 9/2007 Robling ................. H04R 1/026 248/676
(Continued)

FOREIGN PATENT DOCUMENTS

KR 10-0873061 12/2008
KR 10-2016-0092790 8/2016
(Continued)

OTHER PUBLICATIONS

PCT International Application No. PCT/KR2021/015887, International Search Report dated Jul. 25, 2022, 4 pages.
(Continued)

*Primary Examiner* — Rockshana D Chowdhury
*Assistant Examiner* — Martin Antonio Asmat Uceda
(74) *Attorney, Agent, or Firm* — LEE, HONG, DEGERMAN, KANG & WAIMEY

(57) ABSTRACT

A display device is characterized by comprising: a display module for outputting an image; a rotation drive unit located on the rear surface of the display module; and a pair of stands extending obliquely downward from the rotation drive unit, wherein the rotation drive unit adjusts the angle of the stands simultaneously when the display module rotates. In the display device, the direction of the display module can be easily changed, and thus it is easy to change the display module according to the arrangement of the screen being output.

8 Claims, 7 Drawing Sheets

(51) Int. Cl.
*G06F 1/16* (2006.01)
*H04N 5/64* (2006.01)

(52) U.S. Cl.
CPC ............. *G06F 1/1601* (2013.01); *H04N 5/64* (2013.01); *F16M 2200/08* (2013.01)

(58) Field of Classification Search
CPC .. F16M 2200/08; F16M 11/046; F16M 11/24; F16M 11/242; F16M 11/126; G06F 1/1601; H04N 5/64; H05K 5/0234; Y10S 248/917; Y10S 248/918
See application file for complete search history.

(56) References Cited

U.S. PATENT DOCUMENTS

| | | | | |
|---|---|---|---|---|
| 7,391,606 | B2 * | 6/2008 | Chen | F16M 11/242 312/223.1 |
| 8,033,229 | B1 * | 10/2011 | McCanna | G03B 21/145 248/176.1 |
| 8,152,113 | B2 * | 4/2012 | Chen | G06F 1/1601 248/371 |
| 8,498,101 | B2 * | 7/2013 | Chiang | G06F 1/1601 361/679.22 |
| 9,271,572 | B2 * | 3/2016 | Fenelon | A47B 9/04 |
| 10,656,671 | B2 * | 5/2020 | Kim | G06F 1/1607 |
| 10,820,434 | B2 * | 10/2020 | Choi | F16M 11/105 |
| 12,305,796 | B2 * | 5/2025 | Chu | F16M 11/18 |
| 12,331,873 | B1 * | 6/2025 | Xing | F16M 11/10 |
| 2003/0160138 | A1 * | 8/2003 | Rawlings | F16M 13/00 248/917 |
| 2008/0062099 | A1 * | 3/2008 | Oshima | F16M 13/02 345/87 |
| 2009/0101771 | A1 * | 4/2009 | Tang | F16M 11/38 248/177.1 |
| 2010/0290176 | A1 * | 11/2010 | Fu | F16M 11/18 361/679.01 |
| 2010/0309618 | A1 * | 12/2010 | Park | F16M 11/24 361/679.01 |
| 2012/0212685 | A1 * | 8/2012 | Tanaka | H04N 5/64 348/E5.128 |
| 2014/0085798 | A1 * | 3/2014 | Myerchin | F16M 11/048 361/679.22 |
| 2015/0267859 | A1 * | 9/2015 | Carpenter | F16M 11/242 84/423 R |
| 2015/0277494 | A1 * | 10/2015 | Oakley | G06F 1/1633 361/679.55 |
| 2020/0344439 | A1 * | 10/2020 | Choi | F16M 11/22 |
| 2021/0059401 | A1 * | 3/2021 | Perelli | A47B 97/04 |
| 2021/0294455 | A1 | 9/2021 | Kang et al. | |

FOREIGN PATENT DOCUMENTS

| | | |
|---|---|---|
| KR | 10-2019-0019021 | 2/2019 |
| KR | 10-2199121 | 1/2021 |

OTHER PUBLICATIONS

European Patent Office Application Serial No. 21963371.6, Search Report dated Dec. 2, 2024, 6 pages.

* cited by examiner

ADJUSTABLE STAND AND ROTATABLE DISPLAY DEVICE

CROSS-REFERENCE TO RELATED APPLICATION(S)

This application is the National Stage filing under 35 U.S.C. 371 of International Application No. PCT/KR2021/015887, filed on Nov. 4, 2021, the contents of which is hereby incorporated by reference herein in its entirety.

TECHNICAL FIELD

The present disclosure relates to a display device for horizontally or vertically rotating a screen horizontally or vertically rotating a screen.

BACKGROUND

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

The display device may be connected to another terminal and used in a wired or wireless manner, and thus a small screen of a mobile device may be enlarged and viewed. However, in a general mobile terminal, a screen is optimized in a vertical direction, and thus when a mobile screen is synchronized, a screen vertically positioned in the middle portion of the display device is output, and left and right portions of the screen may not be utilized.

A screen in a vertical direction is more convenient to view a document when connected to a computer and used, such as a monitor, and thus there is a case in which a horizontal direction is useful and a vertical direction is useful according to an aspect of use.

However, in a display device according to the related art, when a screen direction is fixed or is changed to a vertical direction and a horizontal direction, a stand is not easily adjusted, and thus it is difficult to easily exchange between horizontal and vertical types.

DISCLOSURE

Technical Problem

An embodiment of the present disclosure is to provide a display device for easily changing a screen direction.

Technical Solution

The present disclosure provides a display device including a display module configured to output an image, a rotation driver located on a rear surface of the display module, and a pair of stands extending diagonally downward from the rotation driver, wherein the rotation driver simultaneously adjusts angles of the stands during rotation of the display module.

The rotation driver may include a main body gear rotating together with the display module, a reverse gear rotating in engagement with the main body gear, a first stand gear rotating in engagement with the reverse gear, and a second stand gear rotating in engagement with the first stand gear, wherein the pair of stands are respectively coupled to the first stand gear and the second stand gear and rotate.

The reverse gear may be larger than the main body gear.

A gear ratio of the main body gear and the reverse gear may be 3:1.

The first stand gear and the second stand gear may be arranged side by side in a horizontal direction.

A center of rotation of the main body gear may form a straight line perpendicular to a contact position of the first stand gear and the second stand gear.

The first stand gear and the second stand gear may rotate while being connected to each other and may be positioned within a rotation radius of the stand.

The display device may further include a weight located lower than the second stand gear.

The stand may include a leg portion extending outward in a horizontal direction from the rotation driver and a base portion extending from the leg portion in a forward direction.

The leg portion may be inclined and extends toward the rear surface of the display module.

The pair of stands may further include rubber inserted into the base portion, and the rubber may include fixed rubber inserted into one side of the pair of stands and rotary rubber inserted into another side of the pair of stands.

The display device may further include a controller located on the rear surface of the display module, and a back cover covering the rotation driver and the controller.

Advantageous Effects

The display device according to the present disclosure may easily change a direction of the display module, making it easy to switch the display module according to the arrangement of an output screen.

When the display module rotates, the height of the stand automatically changes, allowing the position of a screen to be changed to an appropriate height, which has an advantage of not requiring additional stand adjustment.

When the display module rotates, the height of the stand is raised, allowing the display module to rotate stably without hitting the floor.

Even if the direction of the display module is changed, the center of gravity of the display device is located lower than a portion in which the stand and the display module are combined, and thus the display device may be held stably.

Effects obtainable from the present disclosure may be non-limited by the above-mentioned effects. And, other unmentioned effects can be clearly understood from the following description by those having ordinary skill in the technical field to which the present disclosure pertains.

BEST MODE

Figure 1:
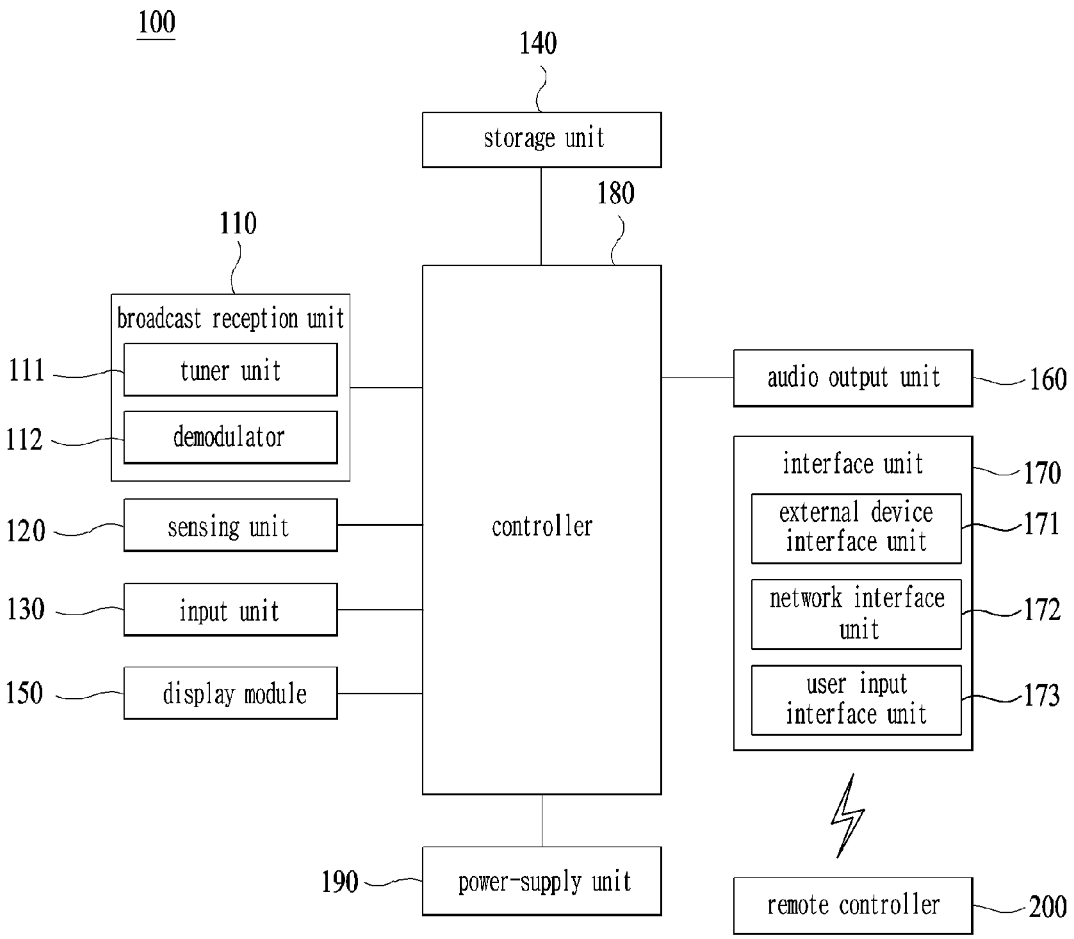
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100. The display device 100 may include a broadcast reception unit 110, an external device interface unit 171, a network interface unit 172, a storage unit 140, a user input interface unit 173, an input unit 130, a controller 180, a display module 150, an audio output unit 160, and/or a power supply unit 190.

The broadcast reception unit 110 may include a tuner unit 111 and a demodulation unit 112.

Unlike the figure, on the other hand, the display device 100 may include only the external device interface unit 171 and the network interface unit 172, among the broadcast reception unit 110, the external device interface unit 171, and the network interface unit 172. That is, the display device 100 may not include the broadcast reception unit 110.

The tuner unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

For example, when the selected broadcast signal is a digital broadcast signal, the tuner unit 111 may convert the broadcast signal into a digital IF (DIF) signal, and when the selected broadcast signal is an analog broadcast signal, the tuner unit 111 may convert the broadcast signal into an analog baseband video or audio (CVBS/SIF) signal. That is, the tuner unit 111 may process the digital broadcast signal or the analog broadcast signal. The analog baseband video or audio (CVBS/SIF) signal output from the tuner unit 111 may be directly input to the controller 180.

Meanwhile, the tuner unit 111 may sequentially select broadcast signals of all broadcast channels stored through a channel memory function, among received broadcast signals, and may convert each of the selected broadcast signals into an intermediate frequency signal or a baseband video or audio signal.

Meanwhile, the tuner unit 111 may include a plurality of tuners in order to receive broadcast signals of a plurality of channels. Alternatively, a single tuner may simultaneously receive broadcast signals of a plurality of channels.

The demodulation unit 112 may receive the digital IF (DIF) signal converted by the tuner unit 111, and may perform demodulation. After performing demodulation and channel decryption, the demodulation unit 112 may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 150, and may output audio through the audio output unit 160.

The sensing unit 120 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

The controller 180 may check the state of the display device 100 based on information collected by the sensing unit, and when a problem occurs, may inform a user of the same or may solve the problem, whereby the controller may perform control such that the display device is maintained in the best state.

In addition, the controller may differently control the content, quality, and size of an image provided to the display module 150 based on a viewer or ambient light sensed by the sensing unit in order to provide the optimum viewing environment. With progress of a smart TV, a large number of functions have been loaded in the display device, and the sensing unit 20 has also been increased in number.

The input unit 130 may be provided at one side of a main body of the display device 100. For example, the input unit 130 may include a touchpad or a physical button. The input unit 130 may receive various user commands related to the operation of the display device 100, and may transmit control signals corresponding to the received commands to the controller 180.

With a decrease in size of a bezel of the display device 100, many display devices 100 have been configured such that the number of physical button type input units 130 exposed to the outside is minimized in recent years. Instead, a minimum number of physical buttons is located at the rear surface or the side surface of the display device, and the display device may receive user input through the touchpad or the user input interface unit 173, a description of which will follow; using a remote controller 200.

The storage unit 140 may store programs for signal processing and control in the controller 180, and may store a processed image, audio, or data signal. For example, the storage unit 140 may store application programs designed to execute various tasks that can be processed by the controller 180, and may selectively provide some of the stored application programs in response to request of the controller 180.

Programs stored in the storage unit 140 are not particularly restricted as long as the programs can be executed by the controller 180. The storage unit 140 may temporarily store an image, audio, or data signal received from an external device through the external device interface unit 171. The storage unit 140 may store information about a predetermined broadcast channel through a channel memory function, such as a channel map.

FIG. 1 shows an embodiment in which the storage unit 140 and the controller 180 are separately provided: however, the present disclosure is not limited thereto. The storage unit 140 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD).

The display module 150 may convert an image signal, a data signal, an OSD signal, and a control signal processed by the controller 180 or an image signal, a data signal, and a control signal received from the interface unit 171 to generate a driving signal. The display module 150 may include a display panel 181 having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 150, and a 3D display may also be used. The 3D display 130 may be classified as a non-glasses type display or a glasses type display.

The display device includes a display module, which occupies a major portion of the front surface thereof, and a case configured to cover the rear surface and the side surface of the display module, the case being configured to package the display module.

In recent years, the display device 100 has used a flexible display module 150, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface.

Meanwhile, the display module 150 may be constituted by a touchscreen, whereby an input device may also be used in addition to an output device.

The audio output unit 160 receives an audio signal processed by the controller 180 and outputs the same as audio.

The interface unit 170 serves as a path to various kinds of external devices connected to the display device 100. The interface unit may include a wireless system using an antenna as well as a wired system configured to transmit and receive data through a cable.

The interface unit 170 may include at least one of a wired/wireless headset port, an external charger port, a wired/wireless data port, a memory card port, a port for connection with a device having an identification module, an audio input/output (I/O) port, a video input/output (I/O) port, and an earphone port.

The broadcast reception unit 110 may be included as an example of the wireless system, and a mobile communication signal, a short-range communication signal, and a wireless Internet signal as well as a broadcast signal may be included.

The external device interface unit 171 may transmit or receive data to or from a connected external device. To this end, the external device interface unit 171 may include an A/V input and output unit (not shown).

The external device interface unit 171 may be connected to an external device, such as a digital versatile disc (DVD) player, a Blu-ray player, a game console, a camera, a camcorder, a computer (laptop computer), or a set-top box, in wired/wireless manner, and may perform input/output operation for the external device.

In addition, the external device interface unit 171 may establish a communication network with various remote controllers 200 in order to receive a control signal related to the operation of the display device 100 from each remote controller 200 or to transmit data related to the operation of the display device 100 to each remote controller 200.

The external device interface unit 171 may include a wireless communication unit (not shown) for short-range wireless communication with another electronic device. The external device interface unit 171 may exchange data with a mobile terminal adjacent thereto through the wireless communication unit (not shown). Particularly, in a mirroring mode, the external device interface unit 171 may receive device information of an application that is executed, and an image of the application from the mobile terminal.

The network interface unit 172 may provide an interface for connection of the display device 100 with a wired/wireless network including the Internet. For example, the network interface unit 172 may receive content or data provided by an Internet or content provider or a network operator through the network. Meanwhile, the network interface unit 172 may include a communication module (not shown) for connection with the wired/wireless network.

The external device interface unit 171 and/or the network interface unit 172 may include a communication module for short-range communication, such as Wi-Fi. Bluetooth. Bluetooth Low Energy (BLE). ZigBee. or Near Field Communication (NFC), or a communication module for cellular communication, such as Long-Term Evolution (LTE), LTE Advance (LTE-A). Code Division Multiple Access (CDMA). Wideband CDMA (WCDMA). Universal Mobile Telecommunications System (UMTS), or Wireless Broadband (WiBro).

The user input interface unit 173 may transmit a user input signal to the controller 180, or may transmit a signal from the controller 180 to a user. For example, the user input interface unit may transmit/receive a user input signal, such as power on/off, channel selection, or screen setting, to/from the remote controller 200, may transmit a user input signal, such as a power key, a channel key, a volume key, or a setting value, input from a local key (not shown) to the controller 180, may transmit a user input signal input from a sensor unit (not shown) configured to sense user gesture to the controller 180, or may transmit a signal from the controller 180 to the sensor unit.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit 111, the demodulation unit 112, the external device interface unit 171, or the network interface unit 172, or may process demultiplexed signals to generate and output a signal for image or audio output.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 160. In addition, the audio signal processed by the controller 180 may be input to an external output device through the external device interface unit 171. Although not shown in FIG. 2, the controller 180 may include a demultiplexing unit and an image processing unit, which will be described below with reference to FIG. 3.

Further, the controller 180) may control the overall operation of the display device 100. For example, the controller 180 may control the tuner unit 111 such that a broadcast corresponding to a channel selected by a user or a pre-stored channel is tuned.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera: however, the present disclosure is not limited thereto. The photographing unit may be implemented by a plurality of cameras. Meanwhile, the photographing unit may be embedded in the display device 100 above the display module 150, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 150 corresponding to the location of the user.

The controller 180 may sense user gesture based on the image captured by the photographing unit, a signal sensed by the sensor unit, or a combination thereof.

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically; the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit needs to be directly connected to a power cable or needs to be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

The remote controller 200 may transmit user input to the user input interface unit 173. To this end, the remote controller 200 may use Bluetooth communication, radio frequency (RF) communication, infrared radiation communication, ultra-wideband (UWB) communication, or ZigBee communication. In addition, the remote controller 200 may receive an image, audio, or data signal output from the user input interface unit 173 so as to be displayed thereon or audibly output therefrom.

Meanwhile, the display device 100 may be a stationary or movable digital broadcast receiver capable of receiving a digital broadcast.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
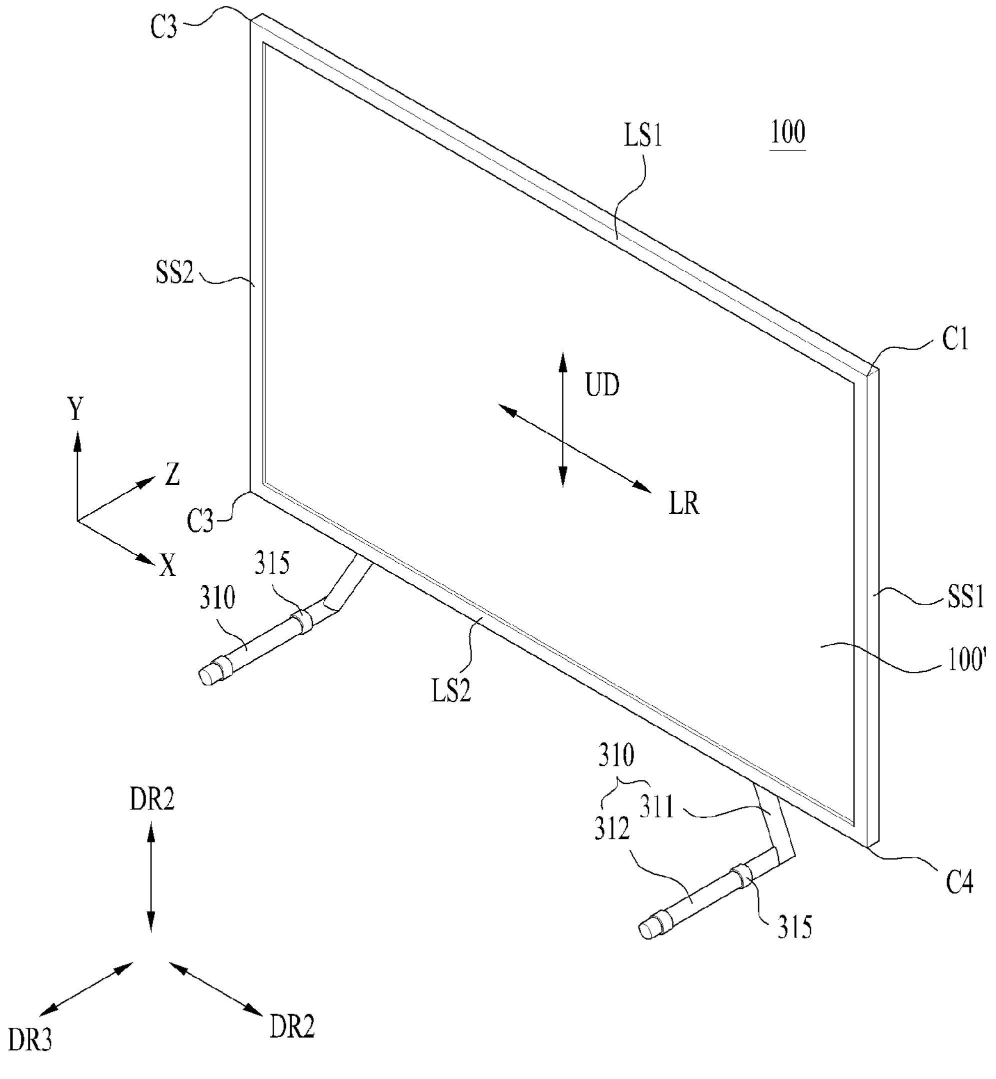
FIG. 2 is a perspective view showing an example of the display device according to the present disclosure.

FIG. 2 is a front perspective view showing an example of the display device.

Referring to FIG. 2, the display device 100 may have a rectangular shape including a first long side LS1, a second long side LS2 opposite the first long side LS1, a first short side SS1 adjacent to the first long side LS1 and the second long side LS2, and a second short side SS2 opposite the first short side SS1.

Here, the area of the first short side SS1 may be referred to as a first side area, the area of the second short side SS2 may be referred to as a second side area opposite the first side area, the area of the first long side LS1 may be referred to as a third side area adjacent to the first side area and the second side area and located between the first side area and the second side area, and the area of the second long side LS2 may be referred to as a fourth side area adjacent to the first side area and the second side area, located between the first side area and the second side area, and opposite the third side area.

In addition, the lengths of the first and second long sides LS1 and LS2 are shown and described as being greater than the lengths of the first and second short sides SS1 and SS2, for convenience of description: however, the lengths of the first and second long sides LS1 and LS2 may be approximately equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

From a different point of view; the side of the display device 100 on which a picture is displayed may be referred to as a front side or a front surface. When the display device 100 displays the picture, the side of the display device 100 from which the picture cannot be viewed may be referred to as a rear side or a rear surface. When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to edges 351 of the display device 100. In addition, points at which the first long side LS1, the second long side LS2, the first short side SS1, and the second short side SS2 are joined to each other may be referred to as corners. For example, a point at which the first long side LS1 and the first short side SS1 are joined to each other may be a first corner C1, a point at which the first long side LS1 and the second short side SS2 are joined to each other may be a second corner C2, a point at which the second short side SS2 and the second long side LS2 are joined to each other may be a third corner C3, and a point at which the second long side LS2 and the first short side SS1 are joined to each other may be a fourth corner C4.

Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as a vertical direction UD.

A stand 310 supporting a main body 100' may include a base portion 312 in close contact with a bottom surface to support the main body 100' including the display module 150 with a large screen, and a leg portion 311 located between the base portion 312 and the main body 100'.

As an area of the base portion 312 is increased, the base portion 312 may more stably support the main body 100', but when the base portion 312 is wide, the display device 100 may be designed to be entirely dull. The display module 150 is thin, but the relatively thick stand 310 is unbalanced in design, and thus, there is a need for the stand 310, which has a thin yet stable design.

To construct a stand with a thin design, as shown in FIG. 2, the two stands 310 extending to a lower portion of the main body 100' are used to ensure balance, and thus the legs are spread out in left and right directions.

The base portion 312 in contact with a mounting surface may extend from the leg portion 311 in the Z-axis direction to prevent the base portion 312 from being inclined in forward and backward directions.

Figure 4:
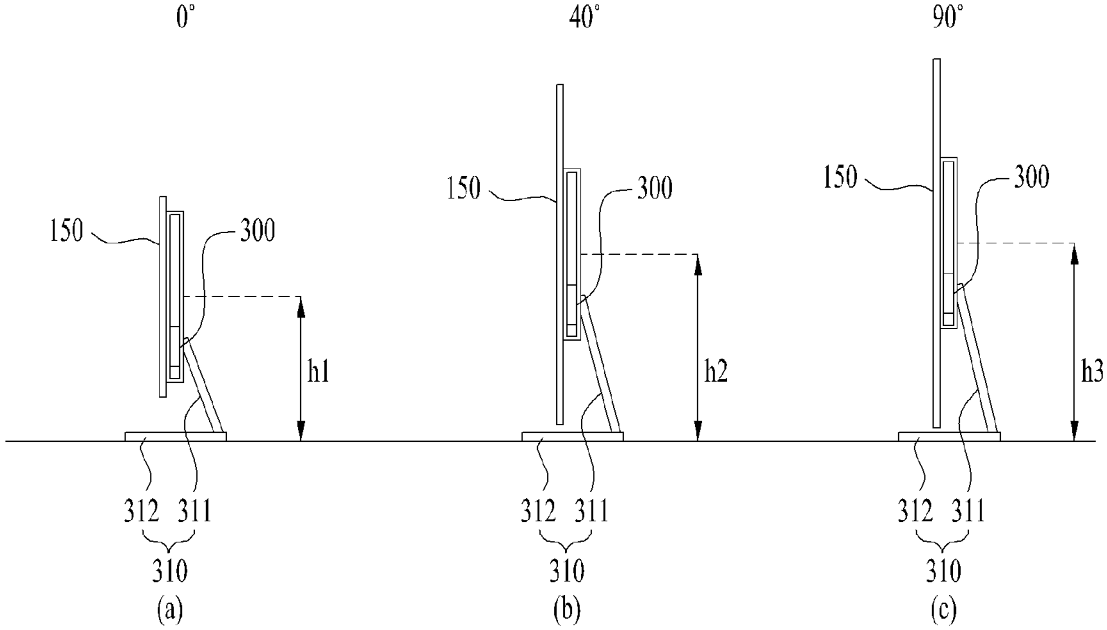

As illustrated in FIG. 4, the leg portion 311 of the stand 310 may extend with an inclination from a rear surface of the display module 150 in a backward direction. In this case, the base portion 312 may extend from a lower end of the leg portion in a forward direction to prevent the main body 100' from tilting in the forward direction.

The display module 150 may be stably supported through the structure of the stand 310 with such a pair of components, and in particular, as shown in FIG. 4, the display module 150 and the stand form a triangle, and thus the main body 100' may be arranged vertically without being tilted in a backward direction.

The leg portion 311 may support the display device 100 to prevent the display device 100 from falling in a backward direction, and the base portion 312 may support the display device 100 to prevent the display device 100 from falling in a forward direction.

The leg portion 311 may protrude further forward from a front surface of the display module 150 for stable support, and as shown in FIG. 2, may prevent the leg portion 311 from sliding on the bottom surface by using rubber 315 including a material with high friction.

The leg portion 311 may be configured in a cylindrical shape to be in contact with a supporting surface even if an angle of the stand 310 is changed.

Figure 3:
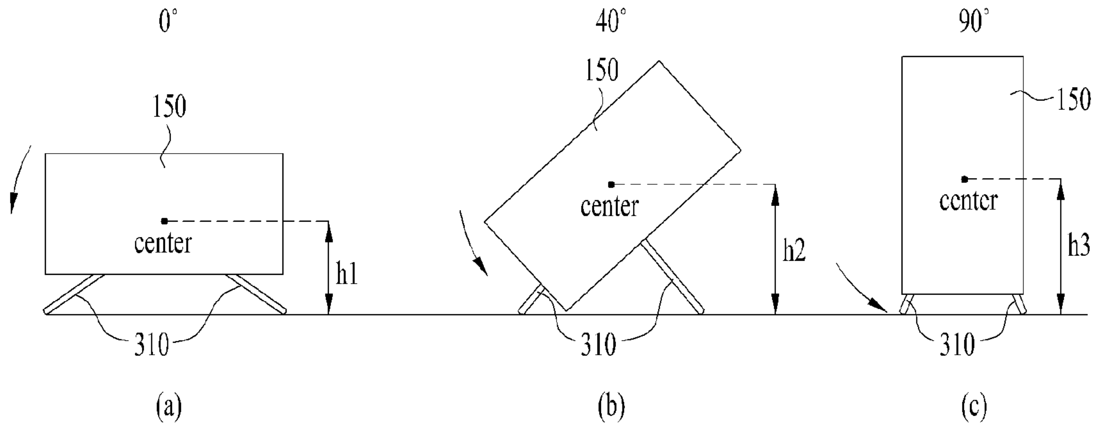
FIGS. 3 and 4 are front and side views showing an operation of a display device according to the present disclosure.

FIGS. 3 and 4 are front and side views showing an operation of the display device 100 according to the present disclosure. In the display device 100 according to the present disclosure, a direction of the main body 100' may be changed as shown in FIGS. 3 and 4. The main body 100' may be positioned horizontally as in (a) of FIGS. 3 and 4 and then vertically as in (c) of FIGS. 3 and 4.

There is also an existing display device 100 in which a direction of the main body 100' is rotated by including a rotation driver 300 between the stand 310 and the display module 150, but a vertical length of the display module 150 is changed to vertically reposition the display module 150 located horizontally, and thus the height of the stand 310 needs to be adjusted.

The length of the stand 310 needs to be adjusted and the display module 150 needs to be rotated, and thus there is a disadvantage in that it is cumbersome to rotate a screen orientation of the display device 100. As a direction of the display module 150 changes, the center of gravity of the display device 100 changes, making it difficult to provide stable support.

Accordingly, the present disclosure provides the display device 100 that is to be stably supported regardless of a direction of the display module 150 when the display module 150 rotates and a height of the stand 310 changes at the same time.

As shown in FIGS. 3 and 4, when the display module 150 rotates with an angle, the height of the stand 310 increases and the center of the display module 150 is raised. This means that when the display module 150 rotates, the stand rotates 310 also rotates to make angle of the leg portion 311 be as vertical as possible, and thus the center of the display module 150 from the ground may be raised.

Figure 5:
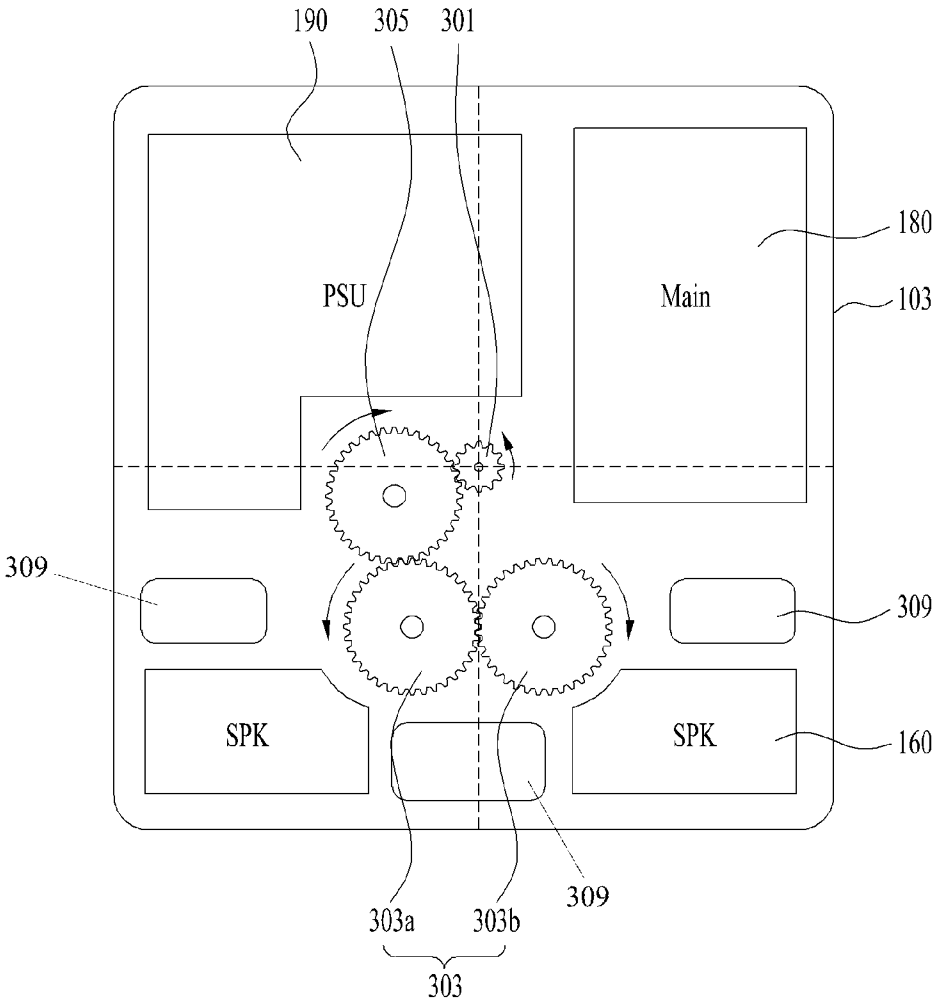
FIG. 5 is a diagram illustrating a rotation driver of a display device according to the present disclosure.

FIG. 5 is a diagram illustrating the rotation driver 300 of the display device 100 according to the present disclosure.

The display device 100 may include a controller located on a rear surface of the display module 150. The controller may also include a battery 190 charged for wireless use. A forward-direction bezel of the display module 150 contains only a minimum space, and thus there is not enough space for the audio output unit 160 to be placed. Therefore, as shown in FIG. 5, the audio output unit 160 may be placed on the rear surface of the display module 150.

The controller 180, the battery 190, the audio output unit 160, and the rotation driver 300 may be placed on the rear surface of the display module 150, and a back cover 103 may be further provided to cover these components of the rear surface of the display module 150. The back cover 103 and the components accommodated therein may be located inside the back cover 103 without rotating when the display module 150 rotates.

The arrangement of the controller 180, the battery, the audio output unit, and so on shown in FIG. 5 is illustrative and not necessarily limited thereto, and heavy components may be located at the bottom in consideration of weight distribution.

The rotation driver 300 includes a gear of the main body 100', which is synchronized with rotation of the main body 100' including the display module 150. A reverse gear 305 rotating in engagement with a main body gear 301 may rotate in a direction opposite to a rotation direction of the main gear 301.

Provided are a first stand gear 303*a* that rotates in engagement with the reverse gear 305 and a second stand gear 303*b* that rotates in engagement with the first stand gear 303*a*.

The first stand gear 303*a* and the second stand gear 303*b* are connected to a pair of the stands 310, and rotation directions of the first stand gear 303*a* and the second stand gear 303*b* are opposite to each other. Therefore, a pair of the stands 310 may move in a direction that spreads left and right or converges in the center depending on a rotation direction of a stand gear 303.

When the display module 150 rotates 90 degrees, if the pair of the stands 310 each rotate 90 degrees, which presupposes that the first stand gear (303*a*) and the second stand gear (303*b*) have a same size, i.e., gear ratio of 1:1, according to an embodiment, the stands 310 are completely arranged in the left and right directions or are gathered side by side at the bottom of the display module 150. To function as the stand 310, the stands 310 need to be placed at a predetermined angle at the bottom of the display module 150, and thus the stands 310 need to be located at the bottom of the display module 150 regardless of whether the direction of the display module 150 is horizontal or vertical.

Therefore, a gear ratio may be changed such that a rotation angle of the main body gear 301 and a rotation angle of the stand gear 303 have a predetermined ratio, that is, the rotation angle of the stand gear 303 is smaller than the rotation angle of the main body gear 301.

According to the present embodiment, when the display module 150 is located horizontally, the pair of the stands 310 may be configured to spread at 120 degrees, and when located vertically, the pair of the stands 310 may be configured to form 60 degrees. In this case, when the display module 150 rotates 90°, one stand 310 needs to rotate 30°, which presupposes that the first stand gear (303*a*) and the second stand gear (303*b*) have a same size, i.e., gear ratio of 1:1, according to an embodiment, and thus a gear ratio may be configured to have 1:3. When the rotation angle of the stand 310 is required to be 27°, the number of gears of the main body gear 301 and the reverse gear 305 may be adjusted to have a gear ratio of 3:10.

Alternatively, the gear ratio of the reverse gear 305 and the main body gear 301 may be set to 1:1, the gear ratio of the reverse gear 305 and the stand gear 303 may be adjusted to 1:3, the gear ratio of the main body gear 301 and the reverse gear 305 may be set to 1:2, and the gear ratio of the reverse gear 305 and the stand gear 303 may be configured as 1:1.5.

Figure 6:
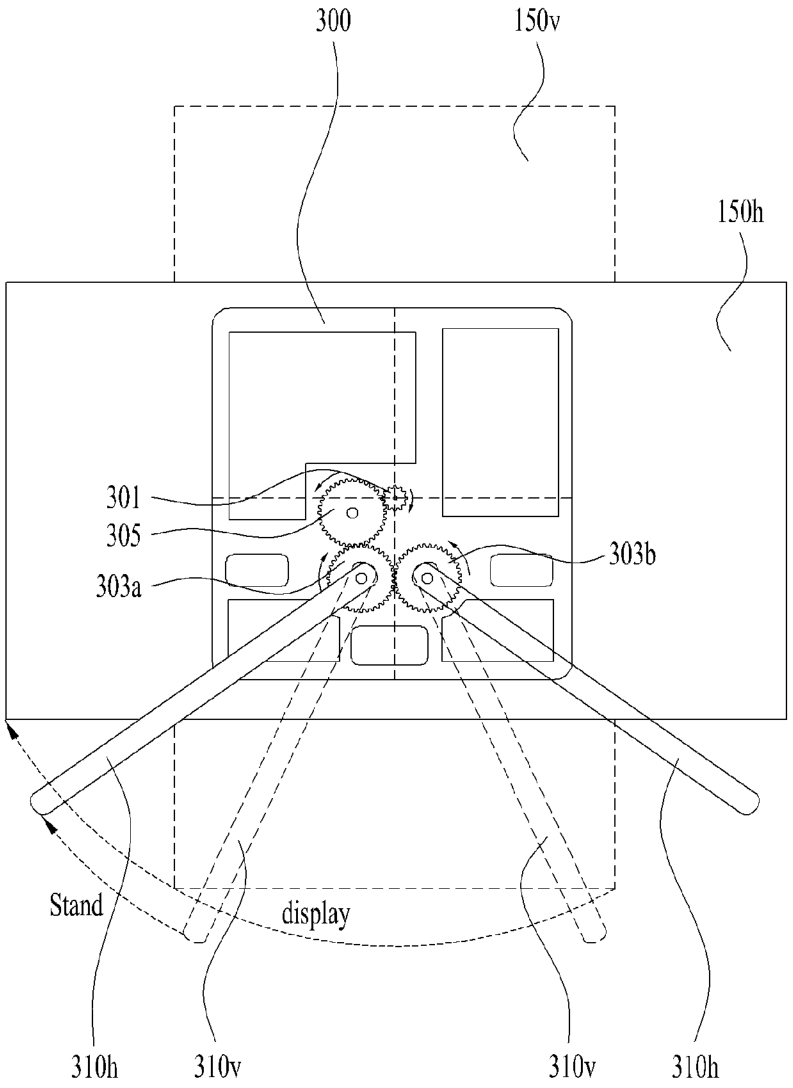
FIGS. 6 and 7 are diagrams showing an operation of a rotating portion of a display device according to the present disclosure.
Figure 7:
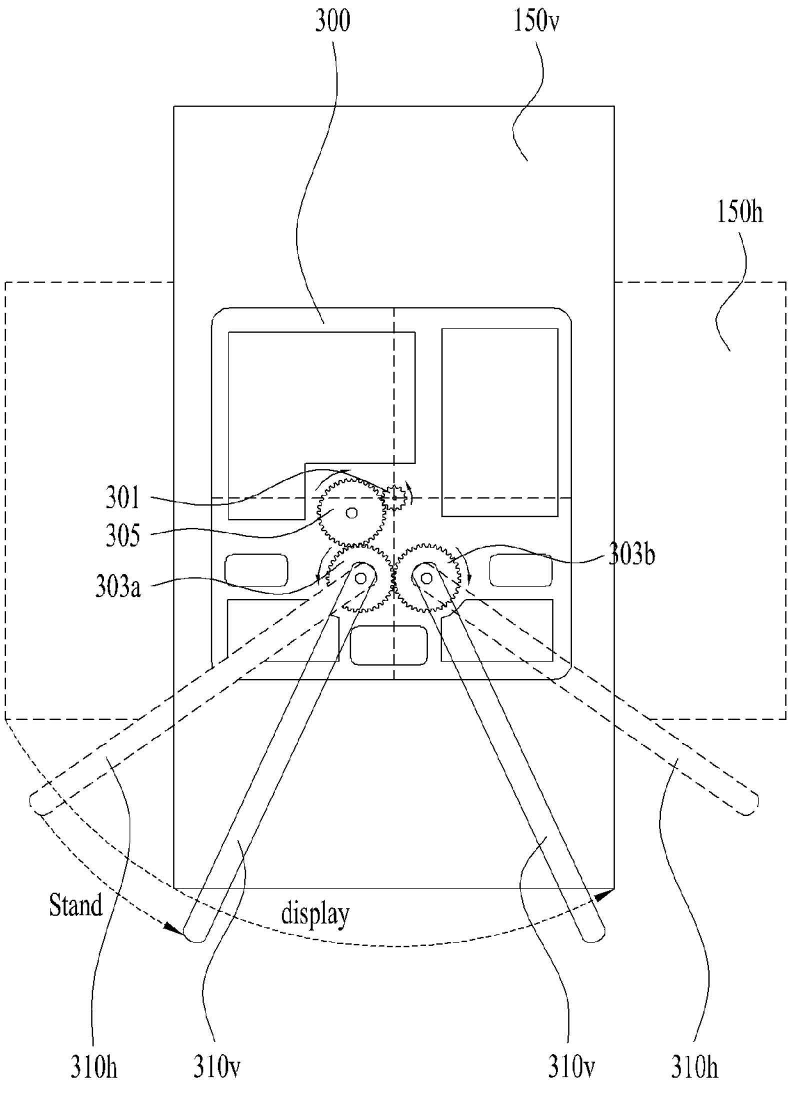

FIGS. 6 and 7 are diagrams showing an operation of a rotating portion of the display device 100 according to the present disclosure. FIGS. 6 and 7 show the display device 100 viewed in a backward direction, and hereinafter, a rotation direction will be explained based on viewing in the backward direction.

When the display module 150 rotates clockwise with the display module 150 arranged vertically; the reverse gear 305 engaged with the main body gear 301 rotates counterclockwise, and the first stand gear 303*a* may rotate clockwise and the second stand gear 303*b* may rotate counterclockwise. The stands 310 may rotate in a direction away from each other, an angle between stands 310*h* may be increased, and the display module may be converted to a horizontal arrangement 150*h* as shown in FIG. 6.

To change the arrangement to the vertical direction as shown in FIG. 7 with the display module 150 arranged vertically, the main body gear 301 may rotate the display module 150 counterclockwise by 90 degrees while the main body gear 301 rotates counterclockwise.

In this case, the reverse gear 305 rotates clockwise, the first stand gear 303*a* rotates counterclockwise, and the second stand gear 303*b* rotates clockwise. The stands 310 rotates in a direction to be closer to each other, that is, in a direction in which an angle therebetween is reduced, and may be switched to an arrangement 310*v* as shown in FIG. 7.

When the screen is changed horizontally or vertically, the screen needs to be rotated in a predetermined direction. When the display module 150 does not rotate clockwise as shown in FIG. 6 but rotates counterclockwise to change the screen in a horizontal direction, the angle between the stands 310 may be reduced and the display device 100 may fall. Therefore, to change the direction of the display module, the display module 150 may be restricted not to rotate in directions other than a predetermined direction.

As shown in FIG. 7, when the screen is located vertically, the display module 150 may be restricted not to rotate clockwise. As such, a stopper (not shown) that limits a rotation angle of the gear module may be provided to prevent the pair of the stand 310 from being widened in a horizontal state or being narrowed in a vertical state.

The clockwise and counterclockwise directions described above may be reversed depending on the arrangement of the reverse gear 305.

When the display module 150 is located vertically, the center of gravity may move upward and the display device 100 may fall, and thus the center of gravity of the non-rotating rotation driver 300 and the controller 180 may be located as downward as possible such that the center of gravity of the non-rotating display module 150 is positioned as low as possible.

Among the components, heavy components such as speakers or batteries may be placed at the bottom, and a weight 309 may be further provided as shown in FIG. 5 to further position the center of gravity downward. In other words, the weight needs to be located as lower as possible than the center of gravity, and thus a back cover 103 in which a hinge driver 300 and the controller 180 are mounted and does not rotate may be located at the bottom of the back cover 103.

Regardless of a direction of the display module 150, the stand 310 needs to always be configured such that the display module 150 is spaced apart from the bottom surface, and thus a length of the stand 310 needs to be configured such that a rotation radius of the stand 310 is larger than a rotation radius of the display module 150.

Both sides of the stand 310 may move on the supporting surface at the same time, but when the display module 150 changes direction, the display device 100 may fall. A first stand 310*a* may be fixed and the position of a second stand 310*b* may be changed.

Figure 8:
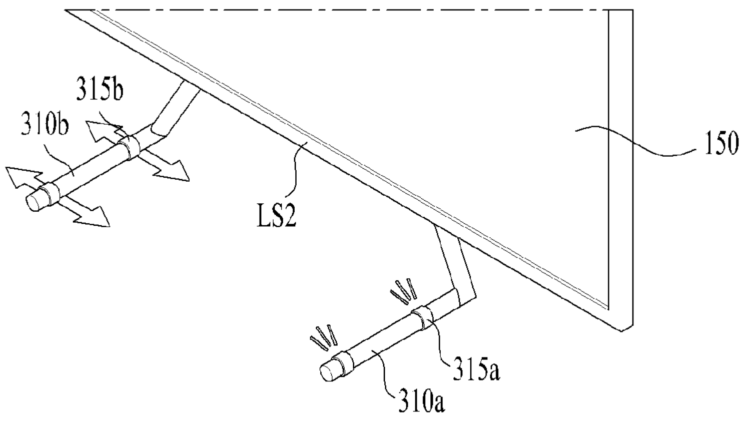
FIG. 8 is a diagram showing rubber of a stand, according to an embodiment of the present disclosure.

FIG. 8 is a diagram showing rubber of a stand, according to an embodiment of the present disclosure.

As shown in FIG. 8, the rubber 315 coupled to the base portion 312 of the first stand 310*a* may be configured as fixed rubber 315*a*, and the rubber 315 of the second stand 310*b* may be configured as rotary rubber 315*b*.

The fixed rubber 315*a* may be configured not to slip on the supporting surface, and thus a mounting position of the first stand 310*a* may not change, and the second stand 310*b* combined with the rotary rubber 315*b* may move toward the first stand 310*a* when the display module 150 rotates, and the rotary rubber 315*b* may assist movement of the first stand 310*a* while rotating according to the movement of the first stand 310*a*.

The rubber 315 may have a ring shape inserted into the base portion 312 of the stand 310, the fixed rubber 315*a* may have an angular shape by specifying a surface in contact with the supporting surface, and the rotary rubber 315*b* may have an outer surface with a circular shape.

The display device 100 according to the present disclosure may easily change the direction of the display module 150, making it easy to switch the display module 150 according to the arrangement of an output screen.

When the display module 150 rotates, the height of the stand 310 automatically changes and the screen position may be converted to an appropriate height, which has an advantage of not requiring additional adjustment of the stand 310.

When the display module 150 rotates, the height of the stand 310 is raised, allowing the display module 150 to rotate stably without hitting the floor.

Even if the direction of the display module 150 is changed, the center of gravity of the display device 100 is located lower than a portion in which the stand 310 and the display module 150 are combined, and thus the display device 100 may be held stably.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

What is claimed is:

1. A display device comprising:

a display module configured to output an image;

a rotation driver located on a rear surface of the display module; and a pair of stands extending diagonally downward from the rotation driver, wherein the rotation driver includes:

a main body gear rotating together with the display module;

a reverse gear rotating in engagement with the main body gear;

a first stand gear rotating in engagement with the reverse gear; and a second stand gear rotating in engagement with the first stand gear, and wherein the pair of stands are respectively coupled to the first stand gear and the second stand gear to be rotated, and wherein a gear ratio of the first stand gear and the second stand gear is 1:1 such that the rotation driver simultaneously adjusts respective angles of the pair of stands equally during rotation of the display module, wherein each of the pair of stands includes:

a leg portion extending outward in a horizontal direction from the rotation driver, a base portion extending from the leg portion in a forward direction, and rubber disposed at the base portion and configured to contact a supporting surface of the display device, wherein the rubber disposed at a first stand of the pair of stands is fixed at the base portion to grip the supporting surface, and wherein the rubber disposed at a second stand of the pair of stands is rotatable with respect to an axis of the base portion so as to allow the second stand to move along the supporting surface while the first stand remains secured on the supporting surface in response to operation of the rotation driver.

2. The display device of claim 1, wherein the reverse gear is larger than the main body gear.

3. The display device of claim 2, wherein a gear ratio of the main body gear and the reverse gear is 3:1.

4. The display device of claim 1, wherein the first stand gear and the second stand gear are arranged side by side in a horizontal direction.

5. The display device of claim 1, wherein the first stand gear and the second stand gear rotate while engaged with each other and are positioned within a rotation radius of the stands.

6. The display device of claim 1, further comprising a weight located lower than the second stand gear.

7. The display device of claim 1, wherein the leg portion is inclined and extends toward the rear surface of the display module.

8. The display device of claim 1, further comprising:

a controller located on the rear surface of the display module; and a back cover covering the rotation driver and the controller.

* * * * *